June 13, 1933.  P. A. GREGORY  1,913,802
CLUTCH DISK
Filed Nov. 10, 1931  3 Sheets-Sheet 1
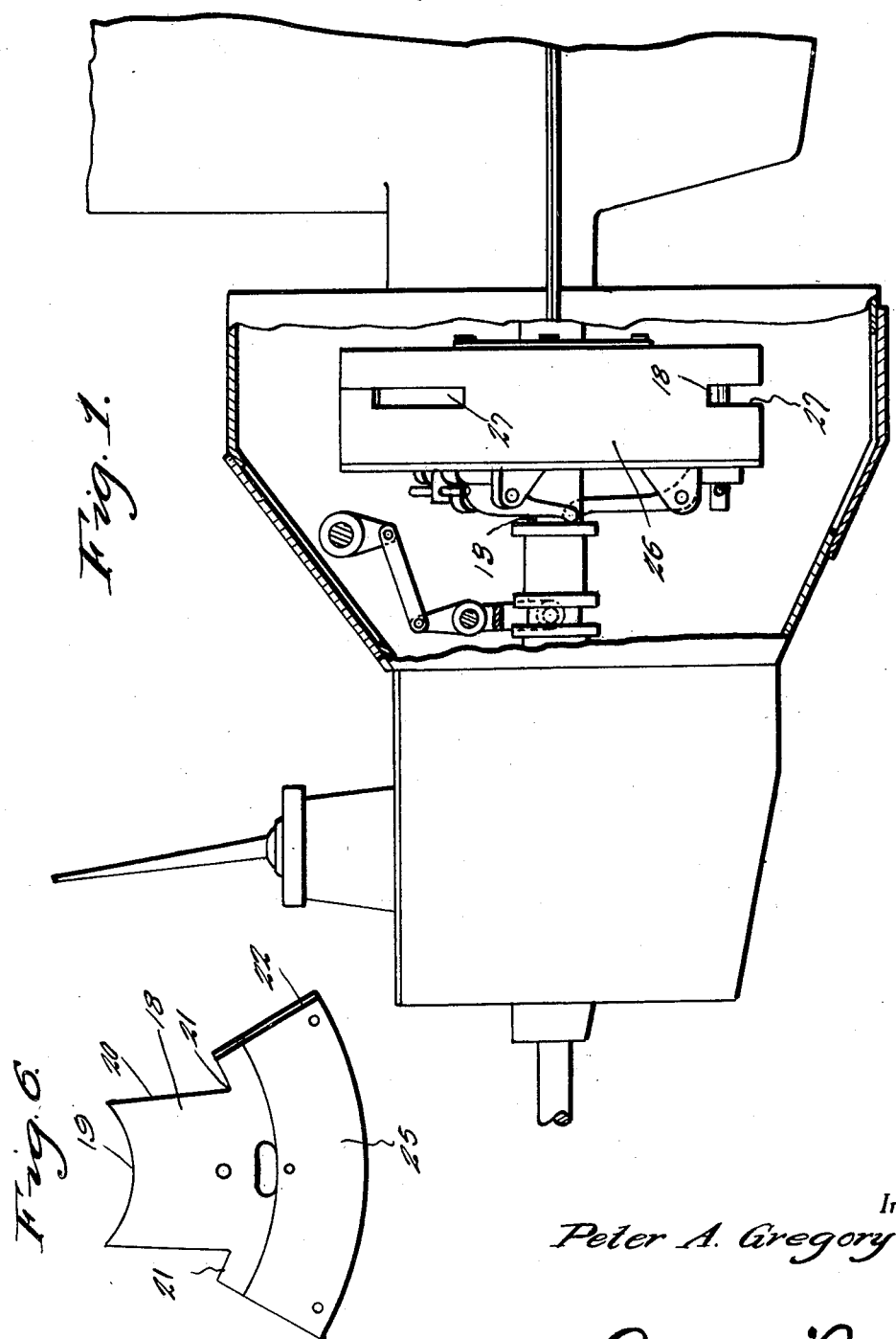
Inventor
Peter A. Gregory
By Clarence A. O'Brien
Attorney June 13, 1933.  P. A. GREGORY  1,913,802
CLUTCH DISK
Filed Nov. 10, 1931  3 Sheets-Sheet 2
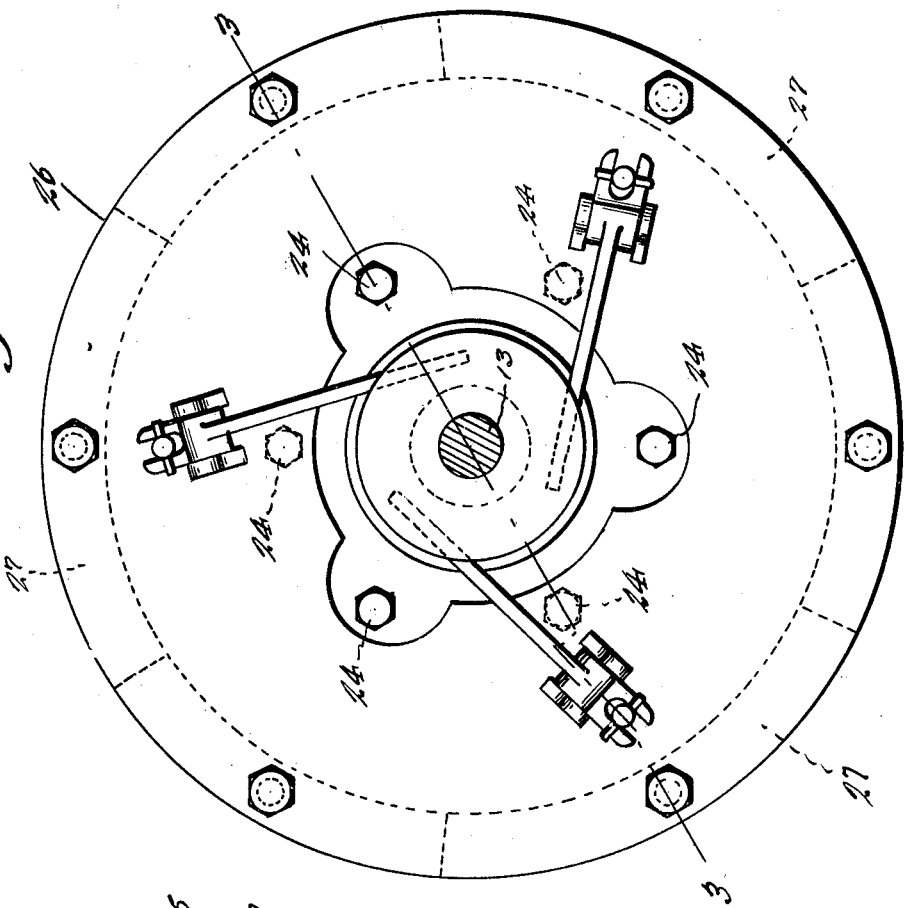
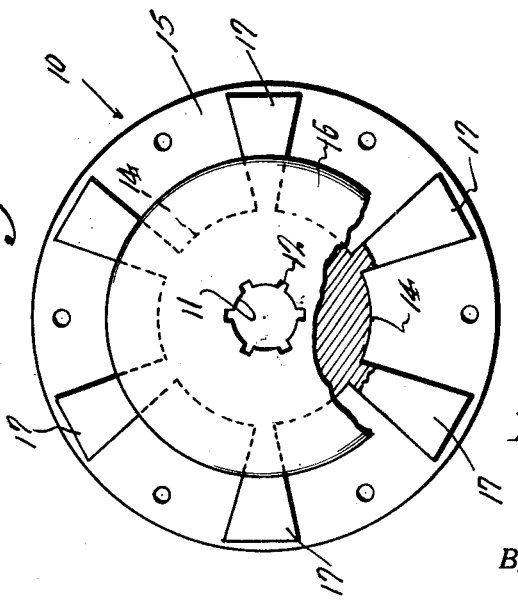
Inventor
Peter A. Gregory
By Clarence A. O'Brien
Attorney

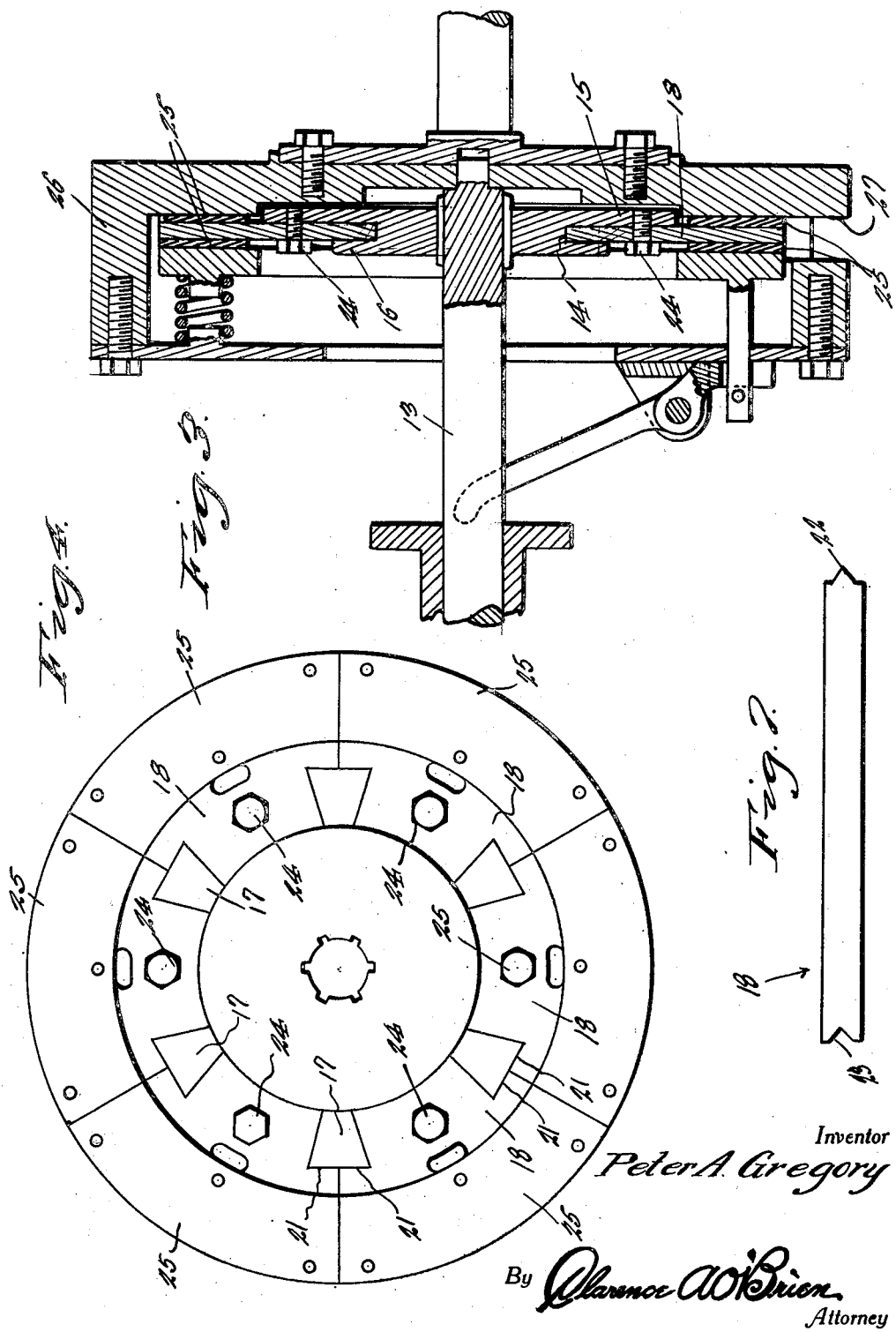

Patented June 13, 1933

1,913,802

UNITED STATES PATENT OFFICE

PETER A. GREGORY, OF CHICAGO HEIGHTS, ILLINOIS

CLUTCH DISK

Application filed November 10, 1931. Serial No. 574,194.

This invention has reference to clutches, and more particularly to that type of clutch used in a self propelled vehicle such as an automobile, tractor, truck and the like.

A primary object of the invention is to provide an improved disk forming part of a clutch assembly, the disk being of such construction, that it may be readily removed without disturbing other parts of the clutch assembly.

Other objects and advantages of the invention will become apparent from a study of the following specification, taken in connection with the accompanying drawings wherein:

Figure 1 is a fragmentary sectional elevational view of a clutch housing such as used on a self propelled vehicle, the fly wheel being shown in elevation to clearly illustrate the only alteration in the construction of the fly wheel as may be required by the use of the invention.

Figure 2 is an elevational sectional view more clearly showing the arrangement of the clutch disk within the clutch assembly.

Figure 3 is a transverse sectional view taken through the fly wheel housing and through the improved clutch disk arranged therein.

Figure 4 is a plan view of the clutch disk.

Figure 5 is a plan view of the hub of the clutch disk, certain parts being broken away and shown in section.

Figure 6 is a plan view of one of the sections forming part of the clutch disk.

Figure 7 is an edge elevational view of one of the said sections.

With reference more in detail to the drawings, it will be seen that my improved clutch disk comprises a hub designated generally by the reference character 10, the same being in the nature of a circular plate provided with a centrally located opening 11 and about said opening provided with keyways 12 to accommodate the keys on the clutch shaft 13 whereby the clutch disk is splined to said shaft in the usual manner.

The hub 10 is provided with a circumferentially extending groove 14 and the diameter of said hub 10 is greater on one side of the groove than on the other side of said groove, whereby to provide comparatively long and short radial flanges 15 and 16 respectively.

On the inner face of the flange 15 is a circular series of wedge shaped lugs 17 that taper longitudinally as they approach the inner wall of the groove 14 as clearly suggested in Figure 5.

The clutch face portion of the clutch disk consists of a series of identically shaped and constructed segmental sections 18 which have their smallest ends insertable in the groove 14 in alternate relation to the lugs 17. At said smallest or inner end the sections 18 have concave edges 19 to conformably engage the inner wall of the groove 14. Inwardly from their convex edges, each of the sections 18, on relatively opposite edges thereof, is notched, as at 20, to provide shoulders 21 engageable with the outer edges of the lugs 17 as clearly suggested in Figure 4.

The portions of the sections 18 that extend radially outwardly beyond the outer ends of the lugs 17 are arranged in end to end relation, and at their abutting ends are interlocked through the medium of tongue and groove means 22, 23.

The sections 18 are secured in assembled relation on the hub 10 through the medium of bolts or other fastening elements 24 that have threaded engagement with the flange 15 of the hub 10. Each section 18, on relatively opposite sides thereof and adjacent its outer edge, is provided with a facing of asbestos 25 or other suitable material.

In actual practice, and as clearly shown in Figure 3, my improved clutch or disk is used to replace the usual type of clutch disk now in use, and is splined to the shaft 13 in the manner before explained, and arranged within the fly wheel 26 as clearly shown in said Figure.

In accordance with the present invention, the periphery of the fly wheel 26 is provided with a circular series of spaced slots 27 elongated circumferentially of the fly wheel and of suitable length as to permit the passage therethrough of a clutch section 18.

With the old type of one-piece clutch disk, to replace it, it was necessary to completely disassemble the clutch assembly, also requiring a disassembly of transmission or universal joints, before the clutch disk could be removed and a new one substituted therefor.

With a clutch disk embodying the features of the present invention, it will be seen that one has ready access to the interior of the fly wheel 26, to loosen the fastening devices 24. If the lining on only one section is worn so as to require replacement, it is apparent that the said one section 18 may be moved opposite to a slot 27 and upon loosening of the fastening device 24 holding that section 18 in place, the same may be removed by passing the section 18 through the slot 27, and a new section passed through the slot and properly positioned and fastened in place as a substitute for the removed section.

Even though I have herein shown and described the preferred embodiment of the invention it is to be understood that the same is susceptible of further changes, modifications and improvements coming within the scope of the appended claims.

Having thus described my invention, what I claim as new is:

1. A clutch disk comprising a hub, comparatively long and short spaced, opposed, radial flanges on the periphery of the hub, a plurality of substantially segmental sections mounted between the flanges and engaged with the periphery of the hub, said sections projecting beyond the periphery of the long flange, and means for detachably securing said sections to the inner side of the comparatively long flange.

2. A clutch disk comprising a hub, comparatively long and short spaced, opposed, radial flanges formed integral with the periphery of the hub, said flanges, in conjunction with the periphery of the hub, defining an annular groove, the outer portion of the comparatively long flange having threaded openings therein, substantially segmental sections engaged in the groove and having openings therein registering with the openings in the comparatively long flange, and bolts passing through the second named openings and threadedly engaged in the first named openings for detachably securing the sections in position, said sections projecting beyond the periphery of the long flange.

3. A clutch disk comprising a hub, comparatively long and short spaced, opposed, radial flanges on the periphery of the hub, said flanges, in conjunction with the periphery of the hub defining an annular groove, substantially wedge-shaped lugs on the inner side of the comparatively long flange, a plurality of substantially segmental sections mounted in the groove, said sections having complemental recesses in their adjacent edges for the reception of the lugs, and means detachably securing the sections to the comparatively long flange.

4. A clutch disk comprising a hub, comparatively long and short spaced, opposed, radial flanges on the periphery of the hub, said flanges, in conjunction with the periphery of the hub defining an annular groove, substantially wedge-shaped lugs on the inner side of the comparatively long flange, a plurality of substantially segmental sections mounted in the groove, said sections having complemental recesses in their adjacent edges for the reception of the lugs, and means detachably securing the sections to the comparatively long flange, each section further having a groove in one edge and tongues on the other edges of the sections engageable in the second named grooves.

In testimony whereof I affix my signature.

PETER A. GREGORY.